Patented Sept. 29, 1925.

1,555,782

UNITED STATES PATENT OFFICE.

THOMAS BLACKADDER, OF BAYSIDE, NEW YORK, AND HERBERT C. REED, OF STAMFORD, CONNECTICUT, ASSIGNORS TO ROBESON PROCESS COMPANY, OF NEW YORK, N. Y., A CORPORATION OF NEW JERSEY.

TANNING COMPOSITION.

No Drawing. Application filed April 26, 1922. Serial No. 556,764.

*To all whom it may concern:*

Be it known that we, THOMAS BLACKADDER and HERBERT C. REED, the former a citizen of the United States, and a resident of Bayside, in the county of Queens and State of New York, and the latter being a citizen of the United States, and a resident of Stamford, in the county of Fairfield and State of Connecticut, have invented certain new and useful Improvements in Tanning Compositions, of which the following is a specification.

This invention relates to tanning compositions; and it comprises as a new tanning and plumping composition a highly acid sulfite waste liquor tanning preparation substantially free of acids foreign to such liquor, said preparation being distinctly acid to methyl violet as well as to other indicators, having a high plumping power and being capable of bleaching iron-stained tanned hide; and it further comprises a method of making such a preparation wherein a sulfite waste liquor is made from a sulfite liquor substantially free of magnesia and of bases other than lime and is thereafter freed from lime with sulfuric acid or another acid capable of forming insoluble calcium salts; said waste liquor being usually neutralized with pure lime and concentrated prior to the stated acid treatment; all as more fully hereinafter set forth and as claimed.

In the manufacture of paper pulp, one of the well known ways is to digest wood with a solution of "sulfite liquor"; an aqueous solution of an acid sulfite. This liquor can be made with sodium, calcium or magnesium as a base, but generally dolomitic lime is employed and in this case the liquor contains the dissolved acid sulfites of both calcium and of magnesium. In the digestion, the acid sulfites mostly disappear as such by reaction with organic matters of the wood; with the so-called "lignone" component. The cellulose is left in insoluble form as paper pulp, while the lignone dissolves and forms, with the bisulfites, a solution of what are often known as the "lignosulfonates" of the bases present. This solution separated from the paper pulp is "cellulose sulfite waste liquor."

As the liquor comes from the digester, it is of about 6° Baumé specific gravity and is of freely acid nature, although containing practically no sulfurous acid as such. The total amount of $SO_2$ present, either as free acid or as sulfites, is not often above 0.06 or 0.07 per cent. The acidity is in part due to acetic acid and other weak acids. It may run as high as 0.75 per cent acidity, calculated as free acetic acid. Commercially, the thin liquor is often neutralized with lime (dolomitic lime is mostly used) and evaporated to form a concentrated preparation. Such materials are on the market and largely used for core binders, etc. Tanning preparations are made from them by various methods, not here important. As stated, the original liquor is quite acid, and while usually probably most of the free acidity is due to acetic acid and similar weak organic acids, yet there are a number of stronger organic acids present in a state of combination with the bases (magnesia and lime). These acids, which are the so-called lignosulfonic acids, vary in strength. Some of them are as "weak" as acetic acid but others, as shown by their influence on various indicators, are to be classed among the strongest organic acids. Some of the lignosulfonic acids blue Congo paper and change methyl orange readily, and some are still stronger, as is shown by their action on methyl violet; an indicator responding only to the strongest acids. When the neutral concentrated material is acidulated with a strong acid, as is sometimes done in making tanning preparations, the weaker acids are set free first.

We have found that these stronger organic acids, which (as free acids) have the power of greening a solution of methyl violet and which occur in the sulfate waste liquor as calcium and magnesium salts, in a free state are particularly advantageous tanning agents, being much better in this respect than the weaker acids. They are also efficient in plumping and have an excellent solvent power for the lime of limed hides. And in addition, they have the very desirable property of bleaching the dark and undesirable colors given leather by certain of the vegetable tanning agents, notably chestnut extract, in the presence of iron. Dark colored leather tanned by chestnut extract is quickly bleached by these organic acids; and these acids, used in connection with vegetable extracts which otherwise produce dark leathers, give light colored products.

In the present invention it is our object to produce a tanning preparation which shall contain in a free state all, or substantially all, of the natural acids of the sulfite waste liquor, including not only the weaker acids but the stronger acids having the power of greening a solution of methyl violet; this preparation being substantially free of bases and being also free of acids or other materials foreign to the sulfite waste liquor in its natural state; and to do this without injurious changes in the natural substances there present. Calcium sulfate is an insoluble body and by cautiously adding sulfuric acid to a sulfite waste liquor containing lime as its only base, it is possible to throw down as a precipitate of calcium sulfate not only the lime but also the added acid. Practically nothing of a mineral nature remains except for a trace of calcium sulfate in solution or suspension. Both the lime acting as a base in the liquor and the added sulfuric acid are removed together. While some of the lignosulfonic acids, as stated, have a very strong acidity, nevertheless, sulfuric acid will remove and precipitate the lime of their calcium salts. Instead of sulfuric acid, oxalic acid may be employed; but we do not recommend this.

In order to have substantially only lime present as a base, the original sulfite liquor used in digesting the wood should be made with a calcite lime, as free of magnesia as practicable. A little magnesia may be present, but it is desirable that the amount be as small as possible. If the sulfite waste liquor be neutralized and concentrated prior to making our product, as it usually is, neutralization should be done with calcite lime; that is, lime as free as practicable from magnesia. Instead of using lime as the base in making the sulfite liquor and in neutralizing the sulfite waste liquor, baryta or strontia may be employed, but the use of these bases under the present price conditions is not so advantageous as the use of lime. Both baryta and strontia form sulfates even more insoluble than calcium sulfate.

Neutralized sulfite waste liquor suffers no change in its organic constituents injurious for the present purposes in evaporation under proper conditions and we may use either such a concentrated material or the original weak liquor in the present invention. The former is the more advantageous, as it gives directly a comparatively concentrated material, better suited for shipment, storage, etc., than the weaker products made from the original weak liquor.

In using the weak liquor, we simply add sulfuric acid in the amount equivalent to the lime present, thereby separating both the lime and the added sulfuric acid as insoluble calcium sulfate. Ordinarily, after the addition of the sulfuric acid, we allow the liquid to stand a few hours in the cold to complete the precipitation. Vigorous stirring for a time is advisable. The precipitate may be separated from the liquor by filter pressing or in other well known ways. This gives a liquor of freely acid nature but not containing foreign or extraneous acids. On addition of a small amount of a solution of methyl violet, a distinct green color is attained. The acid liquor so obtained plumps hide very well, the plumping being about double that obtained with water. It is also an efficient agent in removing lime. It has an energetic tanning action. If applied to hide tanned with chestnut extract and blackish or grayish because of iron-tan combinations, the leather is bleached. Ordinarily, however, we find it better to make a stronger preparation than can be obtained from the original weak liquor, and to this end we take the weak waste liquor made from sulfite liquor with lime as the only base, neutralize with pure lime and concentrate, usually to 30° B., or thereabouts. The concentrated liquid is treated in the cold with carefully added sulfuric acid, care being taken to avoid any heating up. The sulfuric acid is usually diluted with some water, and is added as cold as practicable. The concentrated sulfite liquor is also used cold and vigorous agitation is resorted to and particularly in the later stages of acidulation. The acid is best added in the exact amount required for combination with the lime present and acting as a base for the lignosulfonic acids; allowance being made for such lime as may be present as calcium sulfate. A concentrated liquor of 30° B., made as described, ordinarily contains around 5 per cent of lime (CaO) and requires 7 to 9 per cent by weight of sulfuric acid; 56 parts of CaO requiring 98 parts of $H_2SO_4$. Starting with a 30° B. liquid, the new preparation made is usually about 25° to 26° B.; the diminution in density being partly due to the lime which has been removed and, usually, partly to water added with the sulfuric acid. The 25° to 26° B. liquid is stable and can be packaged and shipped in the usual containers. Stronger preparations can be made by using a concentrated sulfite waste liquor of more than 30° B.; say, 32° to 33° B., but this is not so desirable. With a liquid of about 30° Baumé giving a final strength of 25° or 26° B., it is easier to separate the insoluble calcium sulfate by filtration. If stronger preparations are desired, the liquid can be concentrated by evaporation; but it is well to do this at the lowest possible temperature, or even at the ordinary temperature. If concentration be resorted to, we do not ordinarily desire to use a temperature of more than, say, about 130° or 140° F. Cryogenic concentration is practicable.

Without care in the addition of sulfuric acid, it is apt to "burn" or change the liquid and especially in the later stages. It is for this reason that we recommend the use of the acid somewhat diluted and as cold as practicable. The apparatus used may be provided with cooling means. While we have stated that we desire to make a preparation as free from lime as possible and to this end usually add the exact, or sustantially exact, quantity of acid corresponding to the lime present, yet some of the advantages of our invention may be obtained with a less quantity of sulfuric acid; i. e., with a little of the lime remaining. For example, instead of using about 8 or 9 per cent of sulfuric acid with a 30° B. liquor, we may use 5 or 6 per cent. But the product is not nearly so advantageous as where enough acid is used to give a complete, or substantially complete, removal of bases. And there is a limit to the amount of lime which can be left in solution in combination with the sulfonic acids in securing a preparation of the properties we desire. With more than about 2.5 per cent of lime still present, starting with the 30° B. liquor containing about 5 per cent lime, the preparation does not evince acidity when tested in a 1 per cent solution with methyl violet. The presence of lime in any substantial quantity is disadvantageous. It renders the preparation less desirable as a tanning, plumping and de-liming agent.

A preparation made as stated from a concentrated liquor of 30° B. and having a density of 25° to 26° B., is substantially free of mineral bases or ash; not having to exceed about 1.2 per cent total ash. With a properly made material, this ash represents, for the most part, calcium sulfate in suspension and solution. Its presence is immaterial. But, if desired, the quantity can be reduced somewhat by various expedients. With quick work, the proportion of ash is apt to be greater, some calcium sulfate coming out by "after crystallizaton" subsequent to filtration. The preparation is not only acid to methyl orange and Congo red, but also to methyl violet. It is of course heavily acid to weak-acid indicators, such as phenolphthalein. It is free of sulfuric acid and other mineral acids and contains no acid foreign to sulfite waste liquor. It tans hide and may be used as a tanning material, alone or in admixture with other tanning agents. It mixes clearly with the various vegetable extracts, such as chestnut extract, quebracho extract, etc. As stated, used with such extracts it prevents discoloration of the hide, and used after them, it bleaches any dark color which they give the leather. The organic acids contained, while not in any way injurious to hide substance, will remove lime from it and will plump it very effectually. There is effected simultaneously with the plumping action, a tanning action. The economy of simultaneous plumping and of effecting a considerable degree of tanning is obvious.

In a typical preparation made under the present invention from a concentrated neutralized sulfite waste liquor of 30° B. containing only lime as a base, by the addition of the calculated amount of sulfuric acid and removal of calcium sulfate as far as practicable in quick operation, the density was 26.5° B. With the particular concentrated sulfite liquor preparation used, this required about 8 per cent of sulfuric acid. The liquid was practically free of mineral matter, containing only 1.20 per cent of which 0.90 per cent was calcium sulfate in suspension and solution. The acidity, as shown by titration in the presence of methyl violet as an indicator, was 6.60 per cent (calculated as acetic acid). Other indicators, such as Congo red and phenolphthalein, gave somewhat larger figures—respectively 8.52 and 9.24 per cent. The percentage of tans was 23.82 and that of non-tans 17.95, the purity being thus 57.0. In a 1 per cent solution, it gave 1.67 times as much plumping action as water.

Typical preparations made in a similar way from "light liquor" (unconcentrated unneutralized digester liquors) have an analysis and properties corresponding to that of the heavier preparations, such as that just described. In either preparations made from light liquor or those made from the heavier liquors, the total acidity, as shown by methyl violet and calculated as acetic acid, is about 15 per cent of the total solids.

What we claim is:

1. As a new tanning material a sulfite waste liquor preparation of highly acid nature, substantially free of acids foreign to sulfite waste liquor, such preparation containing free lignosulfonic acids of strongly acid properties, such acids causing an acidity of such a nature as to be shown by methyl violet as well as by other indicators.

2. As a new tanning material a sulfite waste liquor preparation of highly acid nature, substantially free of bases and ash components and of acids foreign to sulfite waste liquor, such preparation having an acidity of such a nature as to be shown by methyl violet as well as by other indicators.

3. As a new composition of matter, a waste sulfite liquor substantially devoid of ash constituents other than calcium sulfate and having its acids in a free state; such preparation being free of mineral acids but containing in a free state organic acids capable of giving an acid reaction with Congo red and methyl violet; such preparation being capable of simultaneously plumping and tanning hide.

4. As a new tanning agent a sulfite liquor preparation of acid nature, such preparation having an acidity, expressed in terms of acetic acid, equal to about 15 per cent of the dissolved solids and being substantially free of ash constituents other than calcium sulfate.

5. As a new tanning agent, a sulfite liquor preparation of acid nature giving a distinct acid reaction with methyl violet and substantially free of basic bodies other than lime.

6. As a new tanning agent, a sulfite liquor preparation of acid nature giving a distinct acid reaction with methyl violet and substantially free of basic bodies other than lime, the amount of lime not being greater than corresponds to 1.0 per cent calcium sulfate in a preparation containing about 40 per cent solid matter.

7. As a new tanning agent, a sulfite liquor preparation containing substantially all the natural acids of sulfite waste liquor in a free state but otherwise unchanged; said preparation being substantially free of ash components other than calcium sulfate.

8. As a new tanning and leather bleaching agent a solution containing in a free state the stronger natural acids of sulfite waste liquor; such preparation being capable of giving an acid reaction with methyl violet and of bleaching iron-stained vegetable tanned leather.

9. As a new tanning agent, a concentrated sulfite liquor preparation of about 25 degrees Baumé and of distinctly acid nature to Congo red and to methyl violet; such preparation being substantially free of magnesia and containing no free sulfuric acid.

10. In the manufacture of a tanning and plumping agent, the process which comprises precipitating a sulfite waste liquor containing substantially only lime as a base with the amount of sulfuric acid corresponding to the lime present in combination with organic acids and removing the precipitate.

11. In the manufacture of a tanning agent, the process which comprises preparing sulfite waste liquor with lime as substantially the only base present, adding sulfuric acid in amount sufficient to produce an acid reaction with methyl violet, the amount of sulfuric acid so added not being greater than that corresponding to the lime present, and separating the calcium sulfate produced.

12. In the manufacture of a tanning agent, the process which comprises preparing a concentrated waste sulfite liquor of about 30° Baumé with lime as substantially the only base present, adding sulfuric acid in amount sufficient to produce an acid reaction with methyl violet, the amount of sulfuric acid so added not being greater than that corresponding to the lime present, and separating the calcium sulfate produced.

In testimony whereof, we have hereunto affixed our signatures.

THOMAS BLACKADDER.
HERBERT C. REED.